(12) United States Patent
Peterson

(10) Patent No.: US 6,729,367 B2
(45) Date of Patent: May 4, 2004

(54) OVERFLOW PREVENTION SYSTEM AND METHOD USING LAMINAR-TO-TURBULENT FLOW TRANSITION

(76) Inventor: Michael Leroy Peterson, 61 Bennoch Rd., Orono, ME (US) 04473

(*) Notice: Subject to any disclaimer, the term of this patent is extended or adjusted under 35 U.S.C. 154(b) by 0 days.

(21) Appl. No.: 10/217,767
(22) Filed: Aug. 13, 2002

(65) Prior Publication Data

US 2004/0031540 A1 Feb. 19, 2004

(51) Int. Cl.$^7$ ................................ B65B 3/04
(52) U.S. Cl. ............... 141/198; 141/95; 220/86.2; 137/413; 137/415
(58) Field of Search .................. 141/1, 95, 198, 141/312, 368; 220/86.2; 137/393, 409, 410, 413, 415

(56) References Cited

U.S. PATENT DOCUMENTS

| | | | | |
|---|---|---|---|---|
| 5,348,177 A | * | 9/1994 | Sung | ............... 220/86.2 |
| 5,503,199 A | | 4/1996 | Whitley, II et al. | |
| 5,507,324 A | | 4/1996 | Whitley, II et al. | |
| 5,515,891 A | | 5/1996 | Langlois | |
| 5,518,797 A | | 5/1996 | Holland | |
| 5,564,464 A | | 10/1996 | Pendleton et al. | |
| 5,566,731 A | | 10/1996 | Holland | |
| 5,660,214 A | * | 8/1997 | Pettesch | ............... 141/198 |
| 5,685,352 A | * | 11/1997 | Faught | ............... 141/331 |
| 5,727,603 A | | 3/1998 | Langlois | |
| 5,829,491 A | | 11/1998 | Bennett | |
| 5,832,953 A | * | 11/1998 | Lattner et al. | ............ 137/315.08 |
| 5,832,968 A | | 11/1998 | Leary | |
| 5,894,809 A | | 4/1999 | Grigaitis et al. | |
| 5,950,688 A | | 9/1999 | Langlois | |
| 5,975,154 A | | 11/1999 | Bennett | |
| 5,979,513 A | | 11/1999 | Brand | |
| 6,167,911 B1 | | 1/2001 | Diamond | |
| 6,237,645 B1 | | 5/2001 | Pountney | |
| 6,289,945 B1 | | 9/2001 | Haboush, II | |

* cited by examiner

Primary Examiner—J. Casimer Jacyna
(74) Attorney, Agent, or Firm—Pierce Atwood (57) ABSTRACT

An overflow prevention system and method for storage tanks includes a flow disturber situated in the tank fill tube, a fluid level sensor for sensing fluid level in the tank, and an actuator that causes the flow disturber to move toward the fill tube inlet in response to rising fluid level sensed by the fluid level sensor. The flow disturber is arranged to travel between a first position in which it does not cause turbulent flow in the fill tube and a second position in which it causes turbulent flow. The actuator is responsive to the fluid level sensor to move the flow disturber to the second position when a predetermined fluid level is reached. The transition to turbulent flow triggers the automatic shut-off feature of the dispensing nozzle to prevent the tank from being filled beyond the predetermined level.

26 Claims, 7 Drawing Sheets

OVERFLOW PREVENTION SYSTEM AND METHOD USING LAMINAR-TO-TURBULENT FLOW TRANSITION

BACKGROUND OF THE INVENTION

This invention relates generally to storage tanks and more particularly to systems for storage tanks designed to prevent overflow both during and subsequent to filling.

It is well known to use storage tanks for holding a variety of fluids such as oil, gasoline, and diesel fuel to name a few. Proper filling of storage tanks is a universal concern, as overfilling of storage tanks may result in spillage, damage to the tank or filling equipment, contamination of land or ground water, or other serious and potentially dangerous results. Concerns over spillage of the tank contents are particularly acute when the tank contents are flammable, toxic and/or environmentally hazardous.

Spillage from fuel tanks on pleasure boats and other marine vessels is particularly troublesome. Some contemporary estimates of such fuel spillage are in excess of six million gallons annually in the United States alone. Globally, fuel spillage is many times this amount. The resultant fuel losses are economically and ecologically detrimental in terms of wasted fuel resources and environmental contamination. The problem has lead the Environmental Protection Agency to mandate that any such spillage be subject to heavy fines.

An internal fuel tank on a marine vessel is typically provided with a vent to enable vapor and fumes to escape under pressure while fuel is being pumped into the fuel tank via the fuel fill tube. As the engine consumes fuel, air is drawn into the tank via the air vent to fill the space from the consumed fuel. Venting is also necessary to accommodate expansion of the fuel when it is heated. During filling of the fuel tank, some fuel may be discharged through the vent into the water as the attendant attempts to fill the tank to capacity. In fact, it is not unknown for filling attendants to purposely fill the tank until fuel is discharged from the vent, using this as an indication that the tank is completely full. It is also possible that fuel may be discharged through the vent subsequent to filling. For example, fuel can be discharged through the vent in a tank filled to capacity as a result of the boat listing from side to side due to waves, wind or other causes. Also, fuel will be discharged through the vent in a tank filled to capacity if a subsequent rise in ambient temperature causes the fuel to expand.

The use of fuel dispensing nozzles that automatically shut off the flow of fuel to the tank when the tank is full can avoid fuel spillage during filling. These nozzles typically operate by sensing a pressure change in the incoming fuel flow that results from filling the tank fill tube. Use of a fuel dispensing nozzle with automatic shut-off will prevent fuel discharge through the fill tube during filling if the fill tube is properly designed to trigger the shut-off at the appropriate time. However, with many designs the automatic shut-off may not be triggered at all because the pressure transition is not sufficient. The result is that fuel will overflow through fill tube if the nozzle is not shut off manually. Because of the location of the vent in many applications, it is also possible that fuel will be discharged through the vent during filling. Discharge through the vent may also occur after filling, even if the automatic shut-off is triggered. For example, if the tank is filled to near capacity, fuel can be discharged through the vent due to boat listing or fuel expansion.

Many prior approaches to spillage rely on the use of a reservoir designed to capture overflow. However, these approaches require additional parts and the use of a reservoir takes up more space on the vessel. None of these approaches address the above-mentioned drawbacks of relying on the automatic shut-off feature of existing fuel dispensing nozzles.

Accordingly, there is a need for a system and method that prevents spillage both during and after filling of a storage tank. It would be desirable to have such a system and method of overflow prevention that facilitates use of automatic shut-off nozzles and does not require provision of an overflow reservoir.

SUMMARY OF THE INVENTION

The above-mentioned need is met by the present invention, which provides an overflow prevention system and method for storage tanks that make use of the existing or slightly modified design of the shut-off nozzles that have become accepted in automotive refueling applications. The system includes a flow disturber arranged to travel in the fill tube of the storage tank, a fluid level sensor for sensing fluid level in the storage tank, and an actuator connected between the flow disturber and the fluid level sensor. The actuator causes the flow disturber to move toward the fill tube inlet in response to rising fluid level sensed by the fluid level sensor. The flow disturber is arranged to travel between a first position in which it does not cause the incoming fluid flow to be turbulent and a second position in which it does cause the incoming fluid flow to be turbulent. The flow disturber is provided with a size, shape and texture that will create a transition from laminar to turbulent flow without risking splashback for the operator.

In operation, the actuator is responsive to the fluid level sensor to move the flow disturber to the second position when a predetermined fluid level is reached. The transition from laminar to turbulent flow triggers the automatic shut-off feature of the dispensing nozzle to prevent the tank from being filled beyond the predetermined level.

In one possible embodiment, the fluid level sensor is a float suspended in the storage tank and the actuator is a mechanical linkage, such as a rod or a flexible cable assembly, connecting the float to the flow disturber.

In another possible embodiment, the fluid level sensor is a float suspended in the storage tank and the actuator comprises a pair of fluid cylinders arranged to transfer motion of the float to the flow disturber.

In yet another possible embodiment, the fluid level sensor is disposed inside the storage tank and produces an electrical signal representative of fluid level in the storage tank. The actuator includes an electromechanical device such as a solenoid that operates the flow disturber via a mechanical linkage in response to the electrical signal.

The present invention and its advantages over the prior art will be more readily understood upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Referring to the drawings wherein identical reference numerals denote the same elements throughout the various views, FIG. 14 show a first embodiment of an overflow prevention system 10 used in connection with a storage tank 12, such as a fuel tank. The present invention is particularly applicable to fuel tanks on marine vessels, but is not so limited and can be used with a wide variety of tanks including automotive fuel tanks and fuel storage tanks (both above and below ground). Furthermore, the present invention can be used with virtually any fluid-containing tank. Thus, as used herein, the term "storage tank" refers to any tank, container, vessel or the like intended to contain fuel or any other type of fluid. For illustrative purposes only, the non-limiting embodiments discussed hereinafter will be described in connection with fuel tanks.

Figure 1:
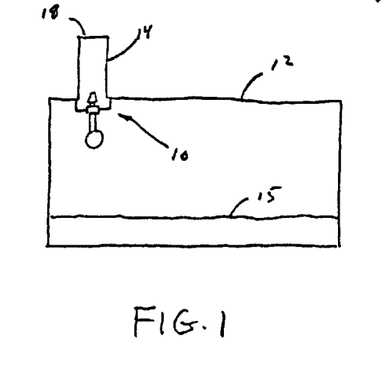
FIG. 1 is a cross-sectional view of a storage tank having one embodiment of an overflow prevention system.
Figure 2:
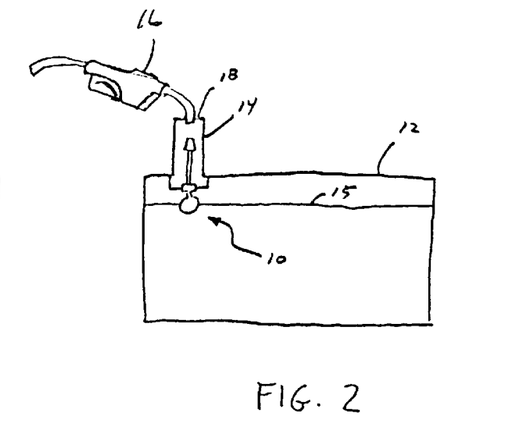
FIG. 2 is another cross-sectional view of the storage tank of FIG. 1.
Figure 3:
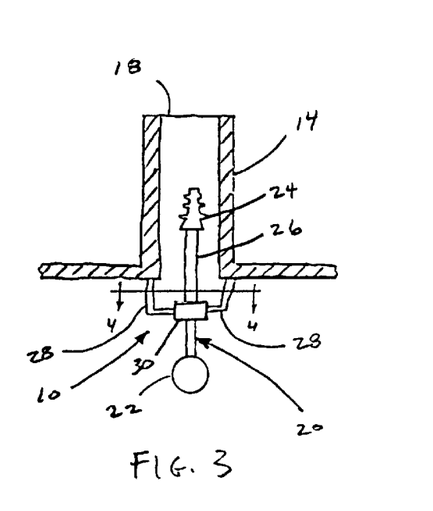
FIG. 3 is an expanded view showing the overflow prevention system of FIGS. 1 and 2 in more detail.

The storage tank 12 includes a fill tube 14 that extends outwardly from the tank 12 to conduct fuel 15 from a fuel dispensing nozzle 16 to the interior of the tank 12. The fill tube 14 has a first or proximate end that is connected to an opening in the tank 12 and a second or distal end that defines an inlet 18. The inlet 18 is sized to accept the nozzle 16, which is a standard fuel dispensing nozzle having an automatic shut-off feature.

Figure 4:
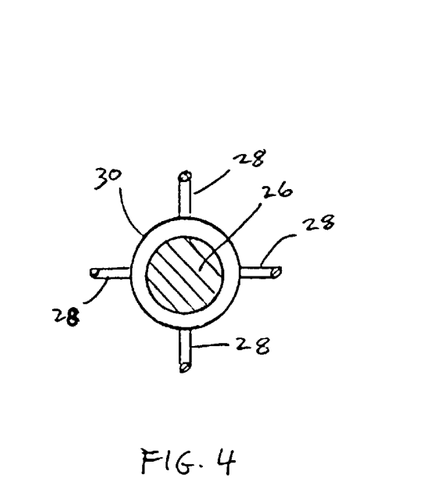
FIG. 4 is a cross-sectional view of the overflow prevention system taken along line 4—4 of FIG. 3.

As best seen in FIG. 3, the overflow prevention system 10 includes a flow transitioning assembly 20 having a fluid level sensor in the form of a float 22, a flow disturber 24, and an actuator 26 connected between the float 22 and the flow disturber 24. In this embodiment, the actuator 26 is a rod that is connected at one end to the float 22 and at the other end to the flow disturber 24. The overflow prevention system 10 further includes support means for positioning the flow transitioning assembly 20 relative to the fill tube 14. This includes a plurality of struts 28 attached to an interior wall of the tank 12 and arranged around the fill tube 14. The struts 28 extend downward into the tank 12 to support a ring 30 below the fill tube 14. Four struts 28 are shown in FIG. 4, but it should be noted that any number of struts could be used to support the ring 30. The ring 30 is positioned substantially coaxially with the fill tube 14. The actuator 26 is slidably received in the ring 30 to position the flow transitioning assembly 20 relative to the fill tube 14. In particular, the float 22 is suspended in the interior of the tank 12 below the ring 30, and the flow disturber 24 is generally aligned with the longitudinal axis of the fill tube 14 above the ring 30. The ring 30 is sized so that the actuator 26 can freely translate along its longitudinal axis but neither the float 22 nor the flow disturber 24 will be able to pass through the ring 30.

The float 22 is designed to float on the fuel 15 in the storage tank 12 and thus moves vertically in response to changing fuel level in the tank 12. The actuator 26 causes the flow disturber 24 to correspondingly move vertically in response to movement of the float 22. The flow disturber 24 thus travels vertically in the fill tube 14 and moves upward toward the fill tube inlet 18 (and the dispensing nozzle 16) as the tank 12 fills with fuel. As will be described in more detail below, the flow disturber 24 is configured to allow fuel from the dispensing nozzle 16 to pass through the fill tube 14 but causes the incoming fluid flow to transition from laminar to turbulent when the flow disturber 24 reaches a predetermined distance from the dispensing nozzle 16. The laminar-to-turbulent transition can occur in either the dispensing nozzle 16 or the fill tube 14. Thus, as used herein, the term "incoming fluid flow" refers to flow in both the nozzle and the fill tube.

The overflow prevention system 10 operates to prevent tank overflow in the following manner. When the fluid level in the tank 12 is low, as shown in FIG. 1, the float 22 is in a lower position which means that the flow disturber 24 is in a low position with respect to the fill tube 14. When the tank 12 is filled with fuel with the dispensing nozzle 16, as shown in FIG. 2, the float 22 moves upward with the rising fluid level and causes the flow disturber 24 to move upward in the fill tube 14. At lower positions, the flow disturber 24 is sufficiently spaced from the dispensing nozzle 16 so as to not cause turbulent flow. That is, the flow disturber 24 permits laminar flow in the fill tube 14 and the nozzle 16. As the flow disturber 24 travels upward in the fill tube 14, it will eventually reach a position close enough to the dispensing nozzle 16 so as to cause the incoming fluid flow to transition from laminar to turbulent. This transition to turbulent flow changes the fluid pressure sensed by the nozzle so as to cause the automatic shut-off feature of the nozzle 16 to be triggered, thereby stopping the flow of fuel into the tank 12. As the float 22 drops due to decreasing fluid level, the actuator 26 lowers the flow disturber 24.

Thus, the overflow prevention system 10 is able to transition fuel flow from laminar to turbulent, and thereby trigger automatic shut-off of the dispensing nozzle 16, based on fluid level in the tank 12. The configuration of the flow transitioning assembly 20 (the length of the actuator 26 relative to the length of the fill tube 14 in particular) is set so that the laminar-to-turbulent transition occurs at a predetermined fluid level. That is, the length of the actuator 26 relative to the fill tube length is set so that the float 22 pushes the flow disturber 24 to the position that it causes turbulent flow when the fluid level in the tank 12 reaches a desired maximum level. The tank 12 cannot be filled beyond this maximum level because the automatic shut-off feature of the dispensing nozzle 16 is triggered. Accordingly, the maximum fluid level in the tank 12 can be controlled to leave sufficient unfilled volume in the tank 12 to prevent fuel from spilling or overflowing due to tank listing or fuel expansion. In one non-limiting embodiment, the flow transitioning assembly 20 is configured so that nozzle shut-off will occur when the tank 12 is filled to about 85–90% of its total capacity.

Figure 5:
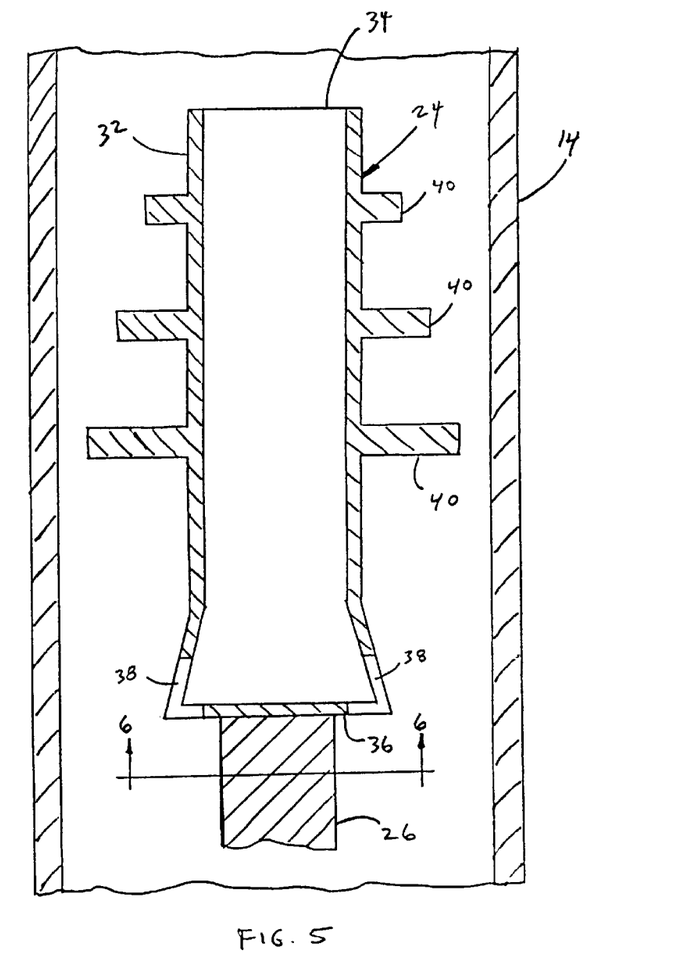
FIG. 5 is a cross-sectional view of one possible configuration of a flow disturber used in an overflow prevention system.
Figure 6:
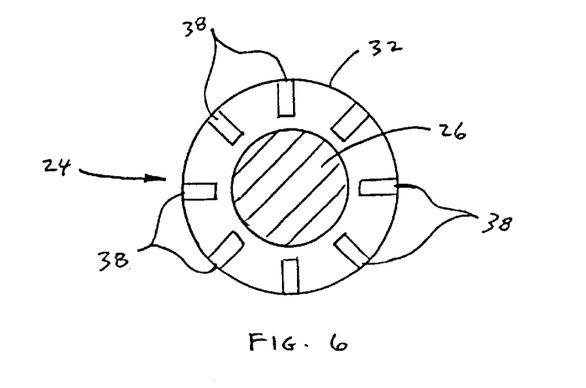
FIG. 6 is a cross-sectional view of the flow disturber taken along line 6—6 of FIG. 5.

As mentioned above, the flow disturber 24 is configured to allow fuel to pass through the fill tube 14 but causes a laminar-to-turbulent flow transition when the flow disturber 24 reaches a predetermined distance from the dispensing nozzle 16. Generally, the flow disturber 24 will have a size, shape and/or texture that will allow it to cause the transition from laminar to turbulent flow. One possible flow disturber configuration is shown in FIGS. 5 and 6. The flow disturber 24 comprises a hollow cylinder 32 having a first open end 34 and a second, partially closed end 36 connected to the end of the actuator 26. The second end 36 is flared so as to extend beyond the outer circumference of the actuator 26. Several slots 38 are formed in the second end 36 to allow fuel to flow through the hollow interior of the cylinder 32. A series of annular ridges 40 is formed on the outside of the cylinder 32. The ridges 40 are spaced along the length of the cylinder 32 and extend radially outward therefrom. The ridges 40 have progressively larger diameters from top to bottom, with the bottom-most ridge having a diameter that is close to, but less than, than inside diameter of the fill tube 14. When the flow disturber 24 is in a lower position with respect to the fill tube 14, fuel is able to flow through the inside of the cylinder 32 and around the ridges 40 on the outside of the cylinder 32 so as to provide laminar flow. But when the flow disturber 24 is moved close to the dispensing nozzle 16, the ridges 40 disrupt the fuel flow sufficiently to cause a laminar-to-turbulent flow transition. The surfaces of the ridges 40 can be roughened to facilitate the laminar-to-turbulent flow transition.

Figure 7:
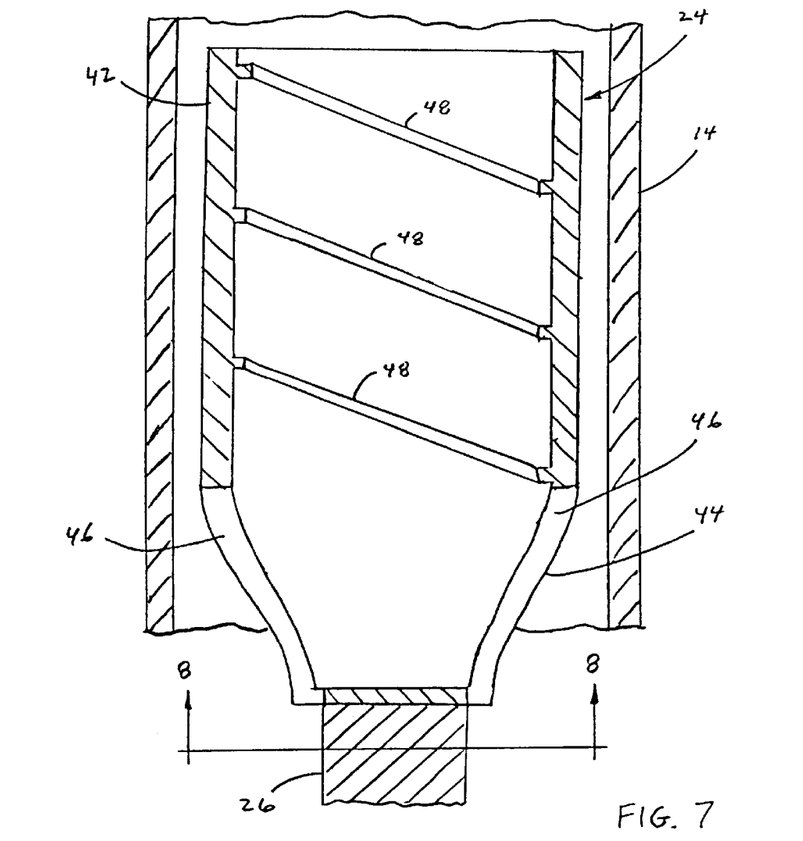
FIG. 7 is a cross-sectional view of another possible configuration of a flow disturber.
Figure 8:
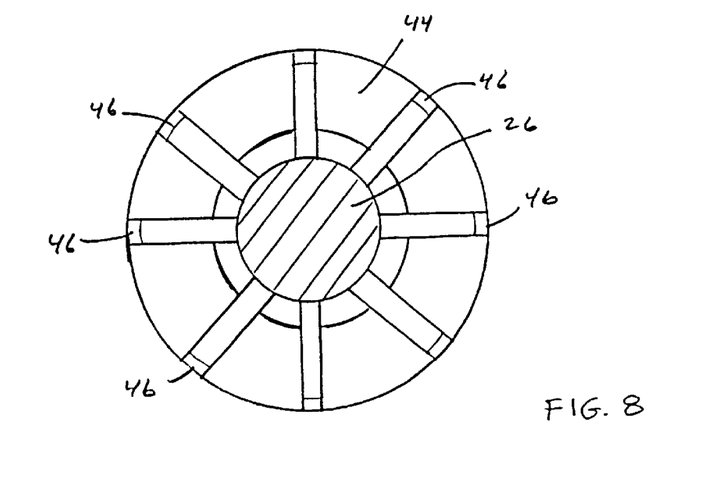
FIG. 8 is a cross-sectional view of the flow disturber taken along line 8—8 of FIG. 7.

FIGS. 7 and 8 show another possible flow disturber configuration. In this configuration, the flow disturber 24 comprises a hollow cylinder 42 and a hollow funnel-shaped structure 44. The hollow cylinder 42 has a diameter that is close to, but less than, than inside diameter of the fill tube 14 and is open at both ends to allow fuel to pass through. The funnel-shaped structure 44 has a large end that has a diameter substantially equal to the cylinder diameter and is connected to one end of the cylinder 42. The funnel-shaped structure 44 tapers down to a smaller end that is connected to the actuator 26. Several slots 46 are formed in the funnel-shaped structure 44 to allow fuel to flow through. A helical ridge 48 is formed on the inside of the cylinder 42. When the flow disturber 24 is in a lower position with respect to the fill tube 14, fuel is able to flow through the inside of the cylinder 42, passing over the ridge 48 and exiting through the slots 46 so as to provide laminar flow. But when the flow disturber 24 is moved close to the dispensing nozzle 16, the ridge 48 disrupts the fuel flow sufficiently to cause the laminar-to-turbulent flow transition.

Figure 9:
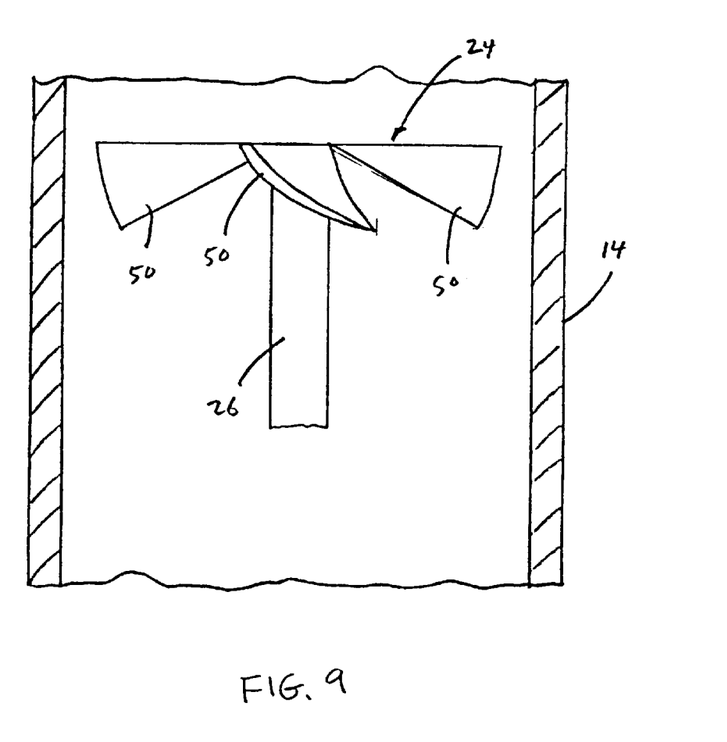
FIG. 9 is a side view of yet another possible configuration of a flow disturber.
Figure 10:
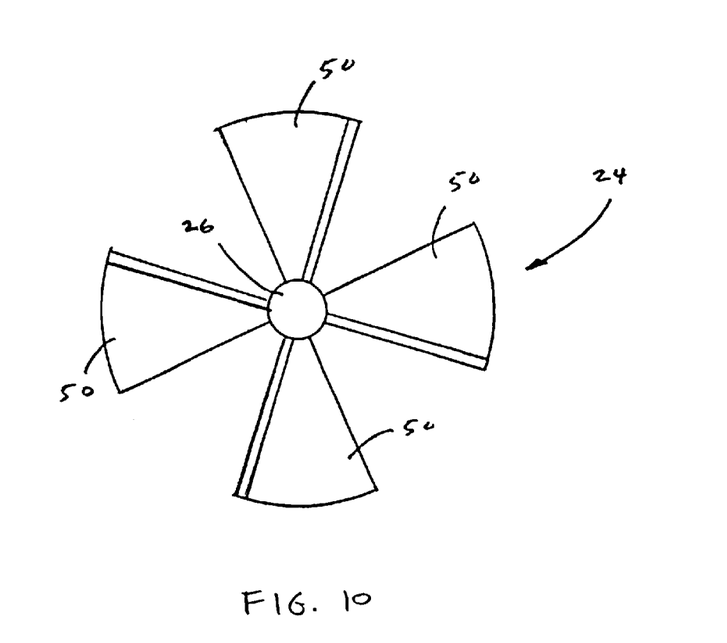
FIG. 10 is a top view of the flow disturber of FIG. 9.

FIGS. 9 and 10 show another possible flow disturber configuration. In this configuration, the flow disturber 24 comprises a number of fins 50 attached to the end of the actuator 26. The fins 50 are disposed circumferentially about the actuator 26 and extend radially outward therefrom. The fins 50 have a downward twist can be provided with surface roughness. When the flow disturber 24 is in a lower position with respect to the fill tube 14, fuel is able to flow over the fins 50 so as to provide laminar flow. But when the flow disturber 24 is moved close to the dispensing nozzle 16, the fins 50 disrupt the fuel flow sufficiently to cause the laminar-to-turbulent flow transition.

While a number of flow disturber configurations have been described herein, one of skill in the art will appreciate that a variety of other structural configurations is possible. In general, an optimal design will maintain the flow in the fill tube but ensure that the flow is transitioned from laminar to turbulent at the appropriate time. The flow disturber will preferably be the smallest possible device that will create laminar-to-turbulent flow transition without risking splashback.

Figure 11:
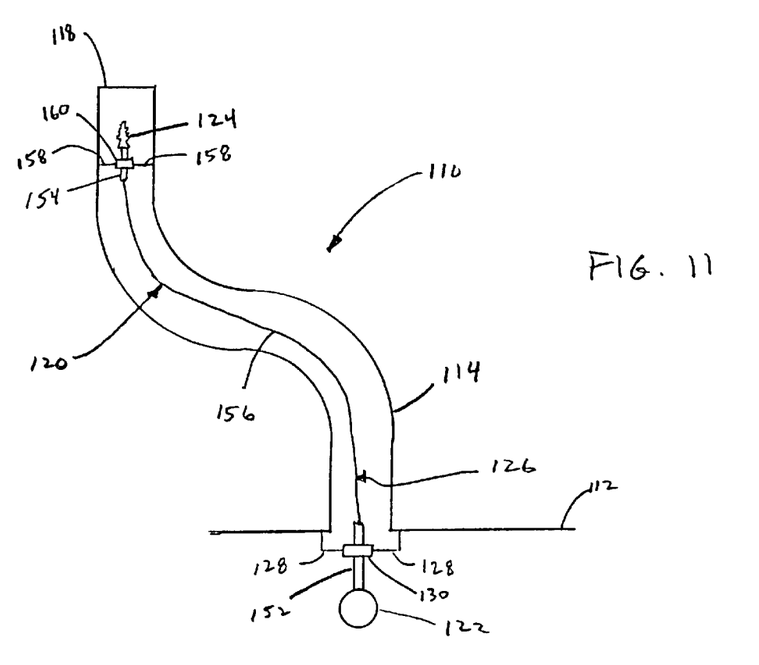
FIG. 11 is a cross-sectional view of an alternative to the overflow prevention system of FIG. 3.

It should be recognized that in many applications the fill tube will not be a straight tube as shown in FIGS. 1–3. For example, the fill tube may require one or more bends of a flexible section to position the fill tube inlet in a location that can be accessed by a dispensing nozzle. FIG. 11 shows an alternative overflow prevention system 110 for use with a curved fill tube 114. The overflow prevention system 110 includes a flow transitioning assembly 120 having a float 122, a flow disturber 124, and an actuator 126 connected between the float 122 and the flow disturber 124. In this embodiment, the actuator 126 is an assembly including a first rod 152 connected to the float 122, a second rod 154 connected to the flow disturber 124, and a flexible cable 156 connected between the first and second rods 152, 154.

A first plurality of struts 128 is attached to an interior wall of the tank 112 and arranged around the fill tube 114. The struts 128 extend downward into the tank 112 to support a first ring 130 below the fill tube 114. The first ring 130 is positioned substantially coaxially with the adjacent portion of the fill tube 114. The first rod 152 is slidably received in the first ring 130 to position the float 122 in the interior of the tank 112 below the first ring 130. The first ring 130 is sized so that the first rod 152 can freely translate along its longitudinal axis but the float 122 will not be able to pass through the first ring 130.

A second plurality of struts 158 is disposed inside the fill tube 114, near the fill tube inlet 118. The second struts 158 support a second ring 160 inside, and substantially coaxially with, the upper end of the fill tube 114. The second rod 154 is slidably received in the second ring 160 to position the flow disturber 124 inside the fill tube 114. The second ring 160 is sized so that the second rod 154 can freely translate along its longitudinal axis but the flow disturber 124 will not be able to pass through the second ring 160.

The actuator 126 causes the flow disturber 124 to move vertically in response to movement of the float 122. In particular, when the float 122 rises or falls, the first rod 152 causes the cable 156 to move correspondingly, which in turn causes the second rod 154 and the flow disturber 124 to move correspondingly. Thus, the flow disturber 124 is caused to travel vertically in the fill tube 114 toward the fill tube inlet 118 (and the dispensing nozzle 116) as the tank 112 fills with fuel. This causes laminar-to-turbulent flow transition and automatic nozzle shut-off to occur in the same manner as described above in connection with FIGS. 14.

Figure 12:
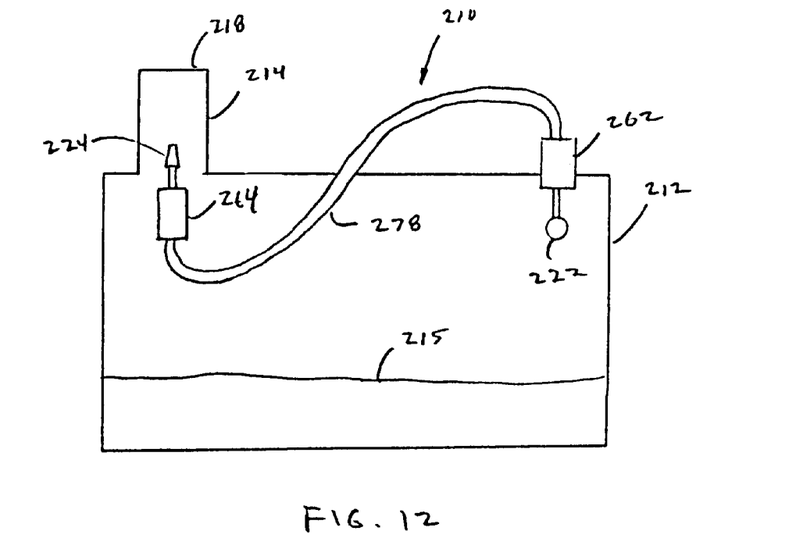
FIG. 12 is a cross-sectional view of a storage tank having another embodiment of an overflow prevention system.
Figure 13:
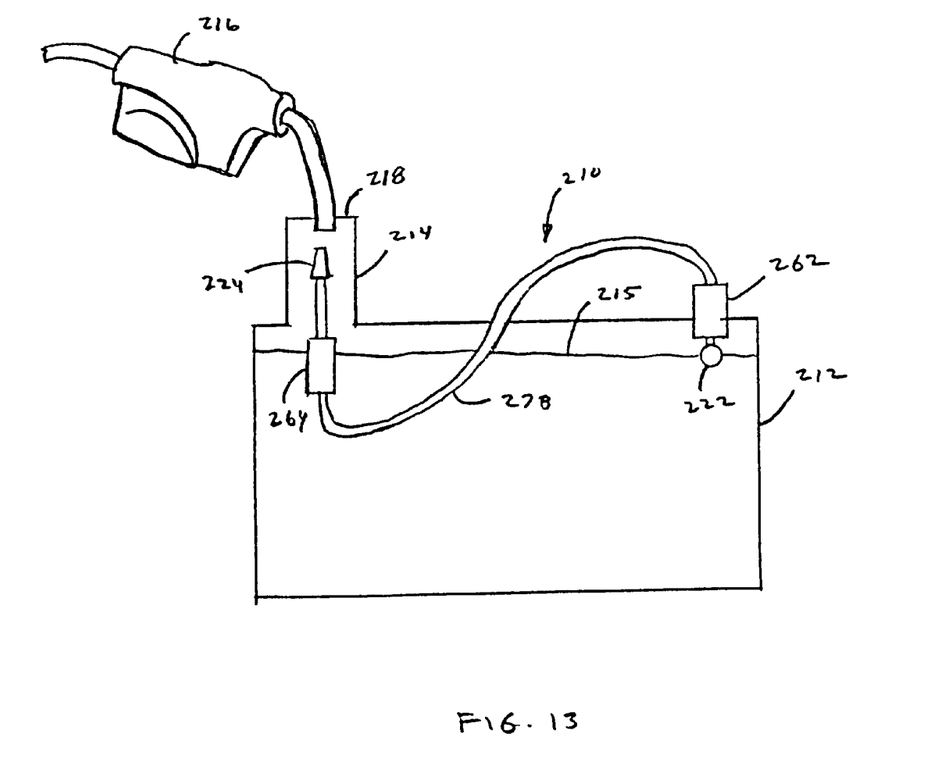
FIG. 13 is another cross-sectional view of the storage tank FIG. 12.
Figure 14:
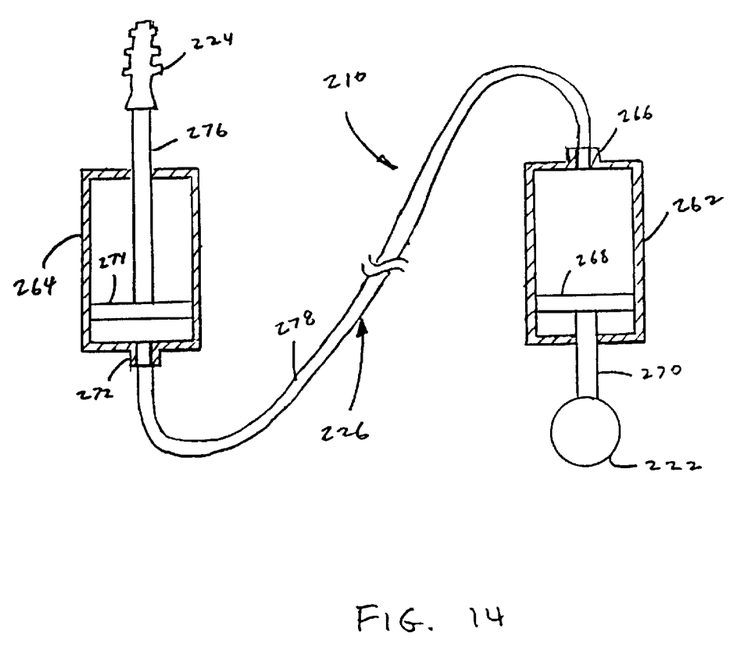
FIG. 14 is an expanded view showing the overflow prevention system of FIGS. 12 and 13 in more detail.

Referring now to FIGS. 12–14, a second embodiment of an overflow prevention system 210 used in connection with a storage tank 212 is shown. The storage tank 212 includes a fill tube 214 to conduct fuel 215 from a fuel dispensing nozzle 216 to the interior of the tank 212. The fill tube 214 has a fill tube inlet 218 that is sized to accept the nozzle 216, which is a standard fuel dispensing nozzle having an automatic shut-off feature.

The overflow prevention system 210 includes a fluid level sensor in the form of a float 222, a flow disturber 224, and an actuator 226 connected between the float 222 and the flow disturber 224. In this embodiment, the actuator 226 is an assembly including a first and second fluid cylinders 262 and 264. The fluid cylinders 262, 264 can be any type of pneumatic or hydraulic cylinder suitable for use in the tank 212. The first fluid cylinder 262 has a port 266, a piston 268 and a piston rod 270; the second fluid cylinder 264 has a port 272, a piston 274 and a piston rod 276. A hose 278 is connected between the first and second ports 266, 272. The float 222 is connected to the outer end of the first piston rod 270, and the flow disturber 224 is connected to the outer end of the second piston rod 276. The first fluid cylinder 262 is mounted to the top of the tank 212 so that the first piston rod 270 and the float 222 are located inside the tank 212. The second fluid cylinder is mounted by a bracket (not shown) below the fill tube 214 with the second piston rod 276 and the flow disturber 224 positioned substantially coaxially with the fill tube 214.

The float 222 is designed to float on the fuel 215 in the storage tank 212 and thus moves vertically in response to changing fuel level in the tank 212. As best seen in FIG. 14, the first piston rod 270 causes the first piston 268 to move upward in the first fluid cylinder 262 in response to upward movement of the float 222. Fluid in the first fluid cylinder 262 is forced through the first port 266 and the hose 278 and into the second fluid cylinder 264 via the second port 272. This forces the second piston 274 to move upward, and the second piston rod 276 pushes the flow disturber 224 upward. The flow disturber 224 thus travels vertically in the fill tube 214 and moves upward toward the fill tube inlet 218 (and the dispensing nozzle 216) as the tank 212 fills with fuel. At lower positions with respect to the fill tube 214 (as shown in FIG. 12), the flow disturber 224 permits laminar flow.

As the flow disturber 224 travels upward in the fill tube 214, it will eventually reach a position close enough to the dispensing nozzle 216 so as to cause the incoming fluid flow to transition from laminar to turbulent (as shown in FIG. 13). This position will correspond to the position of the float 222 when the desired maximum fluid level in the tank 212 is reached. The transition to turbulent flow changes fluid pressure so as to cause the automatic shut-off feature of the nozzle 216 to be triggered, thereby stopping the flow of fuel into the tank 212. When the float 222 drops due to decreasing fluid level, the actuator 226 operates in reverse to lower the flow disturber 224.

Figure 15:
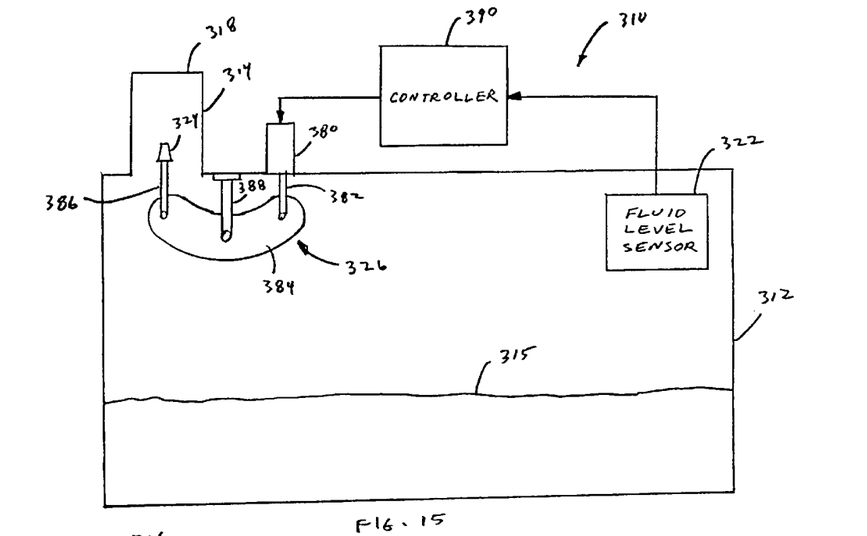
FIG. 15 is a cross-sectional view of a storage tank having yet another embodiment of an overflow prevention system.
Figure 16:
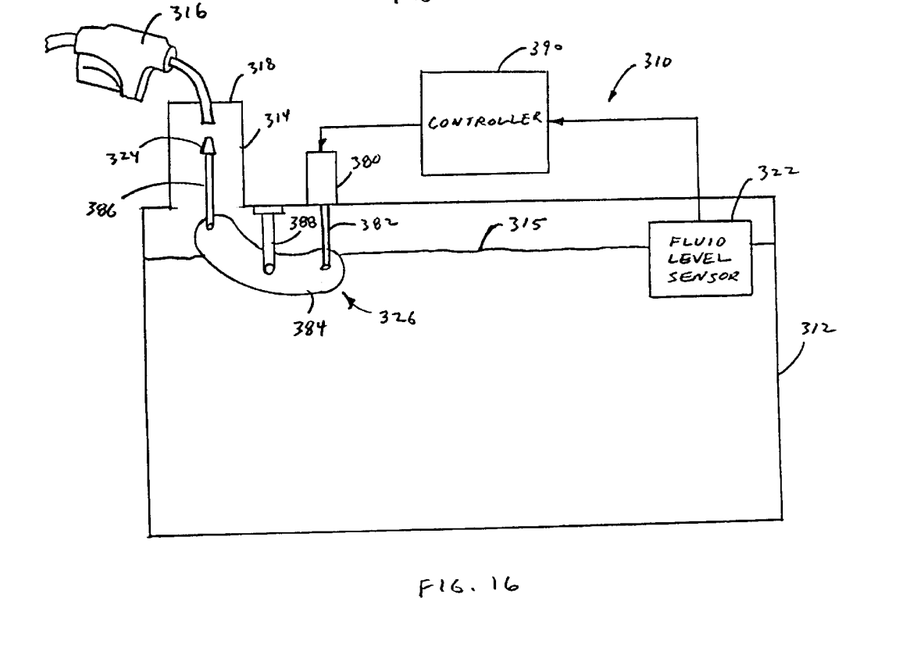
FIG. 16 is another cross-sectional view of the storage tank FIG. 15.

Referring now to FIGS. 15 and 16, a third embodiment of an overflow prevention system 310 used in connection with a storage tank 312 is shown. The storage tank 312 includes a fill tube 314 to conduct fuel 315 from a fuel dispensing nozzle 316 to the interior of the tank 312. The fill tube 314 has a fill tube inlet 318 that is sized to accept the nozzle 316, which is a standard fuel dispensing nozzle having an automatic shut-off feature.

The overflow prevention system 310 includes a fluid level sensor 322 disposed inside the tank 312, a flow disturber 324, and an actuator 326 connected between the fluid level sensor 322 and the flow disturber 324. The fluid level sensor 322, shown schematically in FIGS. 15 and 16, can be any type of fluid level sensing device that produces an electrical signal representative of the fluid level. For example, this could include float-based devices wherein a float moving in response to changing fluid level operates an electrical device, such as a magnetic reed switch or a potentiometer, to generate the electrical signal. Ultrasonic level sensing devices could also be used. The actuator 326 is an assembly including an electromechanical device such as a solenoid 380 having a push rod 382, a rocker 384, and a connecting rod 386. The solenoid 380 is mounted the top of the tank 312 so that the push rod 382 extends into the tank 312 adjacent to the fill tube 314. The rocker 384 is pivotally mounted at a midpoint to a bracket 388 attached to the interior of the tank 312. The distal end of the push rod 382 is pivotally connected to one end of the rocker 384, and one end of the connecting rod 386 is pivotally connected to the other end of the rocker 384. The flow disturber 324 is connected to the other end of the connecting rod 386. The connecting rod 386 and the flow disturber 324 are positioned substantially coaxially with the fill tube 314.

The fluid level sensor 322 outputs the fluid level signal to a controller 390, and the controller 390 outputs a control signal to the solenoid 380 to actuate the flow disturber 324. Specifically, when the fluid level in the tank 312 is below the desired maximum level, as shown in FIG. 15, the fluid level sensor 322 senses this condition and outputs an appropriate fluid level signal. In response, the controller 390 outputs a control signal that causes the solenoid 380 to retract the push rod 382. Accordingly, the rocker 384 is oriented with respect to the bracket 388 such that the connecting rod 386 positions the flow disturber 324 at a low position relative to the fill tube 314. The flow disturber 324 permits laminar flow in the fill tube 314 and the nozzle 316 at this lower position.

When the fluid level in the tank 312 reaches the desired maximum level, as shown in FIG. 16, the fluid level sensor 322 senses this condition and outputs an appropriate fluid level signal. In response, the controller 390 outputs a control signal that causes the solenoid 380 to extend the push rod 382. This rotates the rocker 384 relative to the bracket 388 such that the connecting rod 386 is pushed upward. The upward motion of the connecting rod 386 pushes the flow disturber 324 upward. The flow disturber 324 thus travels vertically in the fill tube 314 to a upper position near the dispensing nozzle 316 and the fill tube inlet 318. In the upper position, the flow disturber 324 will be close enough to the dispensing nozzle 316 so as to cause the incoming fluid flow to transition from laminar to turbulent. The transition to turbulent flow changes fluid pressure so as to cause the automatic shut-off feature of the nozzle 316 to be triggered, thereby stopping the flow of fuel into the tank 312.

One of skill in the art will appreciate that if the fill tube 314 is curved, connecting rod 386 can be replaced by a flexible cable arrangement similar to that described above in connection with FIG. 11. Furthermore, it should be noted that other electromechanical devices could be used instead of a solenoid in this embodiment.

While specific embodiments of the present invention have been described, it will be apparent to those skilled in the art that various modifications thereto can be made without departing from the spirit and scope of the invention as defined in the appended claims.

What is claimed is:

1. A system for preventing overflow in a storage tank having a fill tube, said system comprising:
    a flow disturber arranged to be moved into and out of a position relative to said fill tube in which said flow disturber causes an incoming fluid flow to transition from laminar to turbulent flow; and
    means for causing said flow disturber to move to said position when a predetermined fluid level is reached.

2. A system for preventing overflow in a storage tank having a fill tube and a fill tube inlet, said system comprising:
    a flow disturber arranged to travel in said fill tube;
    a fluid level sensor for sensing fluid level in said storage tank; and an actuator connected between said flow disturber and said fluid level sensor, said actuator causing said flow disturber to move toward said fill tube inlet in response to rising fluid level, such that said flow disturber causes flow in said fill tube to transition from lminar to turbulent when a predetermined fluid level is reached.

3. The system of claim 2 wherein said flow disturber comprises a hollow cylinder having an open end and a partially closed end with a plurality of slots formed in said partially closed end and a series of annular ridges extending radially outward from said cylinder.

4. The system of claim 3 wherein said ridges have progressively larger diameters from said open end to said partially closed end.

5. The system of claim 2 wherein said flow disturber comprises:
   a hollow cylinder open at both ends and having a helical ridge formed on an inner surface thereof; and
   a hollow funnel-shaped structure connected to one end of said cylinder and having a plurality of slots formed therein.

6. The system of claim 2 wherein said flow disturber comprises a plurality of radially outward extending fins attached to said actuator.

7. The system of claim 2 wherein said fluid level sensor is a float suspended in said storage tank and said actuator is a rod connected at one end to said float and at the other end to said flow disturber.

8. The system of claim 2 wherein said fluid level sensor is a float suspended in said storage tank and said actuator includes a first rod connected to said float, a second rod connected to said flow disturber, and a flexible cable connected between said first and second rods.

9. The system of claim 2 wherein said fluid level sensor is a float suspended in said storage tank and said actuator comprises:
   a first fluid cylinder having a first port, a first piston and a first piston rod, wherein said first piston rod is connected to said float;
   a second fluid cylinder having a second port, a second piston and a second piston rod wherein said second piston rod is connected to said flow disturber; and
   a hose connected between said first and second ports.

10. The system of claim 9 wherein said second piston rod and said flow disturber are positioned coaxially with said fill tube.

11. The system of claim 2 wherein said fluid level sensor is disposed inside said storage tank and produces an electrical signal representative of fluid level in said storage tank, and said actuator is an electromechanical device that operates said flow disturber in response to said electrical signal.

12. The system of claim 11 wherein said electromechanical device comprises:
   a rocker pivotally mounted inside said storage tank;
   a solenoid having a push rod, said solenoid being mounted to said storage tank so that said push rod extends into said storage tank, one end of said push rod being pivotally connected to a first end of said rocker; and
   a connecting rod having a first end pivotally connected to a second end of said rocker and a second end connected to said flow disturber.

13. The system of claim 12 wherein said connecting rod and said flow disturber are positioned coaxially with said fill tube.

14. A system for preventing overflow in a storage tank having a fill tube, said system comprising:
   a flow disturber arranged to travel between a first position in which said flow disturber does not cause an incoming fluid flow to be turbulent and a second position in which said flow disturber causes an incoming fluid flow to be turbulent;
   a fluid level sensor for sensing fluid level in said storage tank; and
   an actuator responsive to said fluid level sensor to move said flow disturber to said second position when a predetermined fluid level is reached.

15. The system of claim 14 wherein said flow disturber comprises a hollow cylinder having an open end and a partially closed end with a plurality of slots formed in said partially closed end and a series of annular ridges extending radially outward from said cylinder.

16. The system of claim 15 wherein said ridges have progressively larger diameters from said open end to said partially closed end.

17. The system of claim 14 wherein said flow disturber comprises:
   a hollow cylinder open at both ends and having a helical ridge formed on an inner surface thereof; and
   a hollow funnel-shaped structure connected to one end of said cylinder and having a plurality of slots formed therein.

18. The system of claim 14 wherein said flow disturber comprises a plurality of radially outward extending fins attached to said actuator.

19. The system of claim 14 wherein said fluid level sensor is a float suspended in said storage tank and said actuator is a rod connected at one end to said float and at the other end to said flow disturber.

20. The system of claim 14 wherein said fluid level sensor is a float suspended in said storage tank and said actuator includes a first rod connected to said float, a second rod connected to said flow disturber, and a flexible cable connected between said first and second rods.

21. The system of claim 14 wherein said fluid level sensor is a float suspended in said storage tank and said actuator comprises:
   a first fluid cylinder having a first port, a first piston and a first piston rod, wherein said first piston rod is connected to said float;
   a second fluid cylinder having a second port, a second piston and a second piston rod wherein said second piston rod is connected to said flow disturber; and
   an hose connected between said first and second ports.

22. The system of claim 21 wherein said second piston rod and said flow disturber are positioned coaxially with said fill tube.

23. The system of claim 14 wherein said fluid level sensor is disposed inside said storage tank and produces an electrical signal representative of fluid level in said storage tank, and said actuator is an electromechanical device that operates said flow disturber in response to said electrical signal.

24. The system of claim 23 wherein said electromechanical device comprises:
   a rocker pivotally mounted inside said storage tank;
   a solenoid having a push rod, said solenoid being mounted to said storage tank so that said push rod extends into said storage tank, one end of said push rod being pivotally connected to a first end of said rocker; and
   a connecting rod having a first end pivotally connected to a second end of said rocker and a second end connected to said flow disturber.

25. The system of claim 24 wherein said connecting rod and said flow disturber are positioned coaxially with said fill tube.

26. A method of preventing overflow in a storage tank having a fill tube, said method comprising:

providing a flow disturber arranged to be moved into and out of a position relative to said fill tube in which said flow disturber causes an incoming fluid flow to transition from laminar to turbulent flow; and moving said flow disturber to said position when a predetermined fluid level is reached.

* * * * *